(12) United States Patent
Neskin et al.

(10) Patent No.: US 10,085,423 B2
(45) Date of Patent: Oct. 2, 2018

(54) REMOTE INTERACTION DEVICE WITH TRACKING OF REMOTE MOVEMENT INPUT

(71) Applicant: PETCUBE, INC., Wilmington, DE (US)

(72) Inventors: Oleksandr Neskin, Dnipropetrovsk (UA); Iaroslav Azhniuk, Kyiv (UA); Andrii Kulbaba, Kyiv (UA)

(73) Assignee: PETCUBE, INC., Wilmington, DE (US)

( * ) Notice: Subject to any disclaimer, the term of this patent is extended or adjusted under 35 U.S.C. 154(b) by 35 days.

(21) Appl. No.: 15/352,270

(22) Filed: Nov. 15, 2016

(65) Prior Publication Data

US 2017/0142933 A1 May 25, 2017

Related U.S. Application Data

(60) Provisional application No. 62/257,436, filed on Nov. 19, 2015.

(51) Int. Cl.
*A01K 15/02* (2006.01)
*F21V 14/02* (2006.01)
*F21V 21/15* (2006.01)
*H04N 5/77* (2006.01)

(52) U.S. Cl.
CPC .......... *A01K 15/025* (2013.01); *A01K 15/021* (2013.01); *F21V 14/02* (2013.01); *F21V 21/15* (2013.01); *H04N 5/77* (2013.01); *H04N 5/772* (2013.01)

(58) Field of Classification Search
CPC ...... A01K 15/025; A01K 15/021; H04N 5/77; H04N 5/772
See application file for complete search history.

(56) References Cited

U.S. PATENT DOCUMENTS 6,094,189 A * 7/2000 Quillen ................... G06F 1/163
  345/156
7,878,945 B2 2/2011 Ungari
8,866,870 B1 * 10/2014 Smith .................... G06F 3/041
  128/897

(Continued)

FOREIGN PATENT DOCUMENTS

WO WO 2011/110814 A2 9/2011

OTHER PUBLICATIONS

WO, PCT/US2016/062081 ISR and Written Opinion, dated Jan. 25, 2017.

(Continued)

*Primary Examiner* — Mishawn Hunter
(74) *Attorney, Agent, or Firm* — One LLP; Joseph K. Liu (57) ABSTRACT

Systems, devices, and methods are provided for remote interaction with a subject in an environment. The device has audio-visual recording and transmitting functionality to provide an operator at a remote location with an audio-visual feed of the environment near the device. The device also has a light emission component which the operator controls and which projects light onto a surface in the environment in the vicinity of the device. The systems, devices, and methods provide operators with the ability to control the positions of the light emission by tracking movement at a remote device at the remote location.

4 Claims, 9 Drawing Sheets

(56) References Cited

U.S. PATENT DOCUMENTS

| | | |
|---|---|---|
| 2002/0071661 A1 | 6/2002 | Nakano et al. |
| 2002/0198516 A1 | 12/2002 | Knopp et al. |
| 2005/0030255 A1 | 2/2005 | Chiu et al. |
| 2007/0068017 A1 | 3/2007 | Tamura et al. |
| 2008/0180537 A1 | 7/2008 | Weinberg et al. |
| 2008/0216765 A1 | 9/2008 | Kates |
| 2009/0215533 A1 | 8/2009 | Zalewski et al. |
| 2010/0064325 A1 | 3/2010 | Fishman et al. |
| 2010/0238194 A1 | 9/2010 | Roach |
| 2011/0025925 A1 | 2/2011 | Hansen |
| 2013/0068173 A1 | 3/2013 | Jamison et al. |
| 2014/0233906 A1 | 8/2014 | Neskin et al. |

OTHER PUBLICATIONS

WO, PCT/US14/17772 ISR and Written Opinion, dated Jul. 10, 2014.
EP, 14754660.0 Extended Search Report, dated Oct. 27, 2016.

\* cited by examiner

REMOTE INTERACTION DEVICE WITH TRACKING OF REMOTE MOVEMENT INPUT

CROSS-REFERENCE TO RELATED APPLICATIONS

The present application claims benefit of priority with U.S. Provisional Application No. 62/257,436, filed Nov. 19, 2015, which is hereby incorporated by reference.

TECHNICAL FIELD

The subject matter described herein relates generally to a remote interaction device, and more particularly to a device at a first location which allows a user at a second, remote location to control a laser pointer at the first location with movement input.

BACKGROUND OF THE INVENTION

Presently, pet owners generally interact with their pets only when they are in the same general location, such as a home. Many pet owners are required to leave their pets alone and unsupervised for numerous hours every day when the pet owner goes to work, runs errands, or leaves town on trips or vacations. Some pets become bored, lethargic, or sedentary when left alone. This can lead to numerous health problems including obesity and depression. Alternatively, some pets become ornery and mischievous when left alone. This can lead to property damage, barking which irritates neighbors, and in extreme cases injury or death of the pet may occur.

One attempted solution to a lack of interaction and stimulation for pets has been to hire pet sitters who may take care of pets while the pet owner is away. Pet sitters often charge an hourly fee and may do little more than feed the pet before leaving. In some cases the pet owner may never know that the pet sitter did not interact with the pet for more than a few minutes. Even in the case of a pet sitter who plays with the pet, the pet owner does not receive the direct benefit of interacting with the pet personally.

Other attempted solutions have included leaving televisions or radios on for the pet while the pet owner is away, attempting to use automatically controlled toys, electro-shock punishment for misbehaving, and passive surveillance systems which provide one-directional monitoring of the pet. Each of these passive and active systems has its own drawbacks ranging from being inefficient to inhumane.

Accordingly, to overcome the above and other problems, a remote interaction device for interacting with pets was proposed in U.S. patent application Ser. No. 14/186,793, Pub. No. US 2014/0233906 A1, to Neskin, et al, the entire content and disclosure of which are herein incorporated by reference. The remote interaction device includes, among other components, a photonic emission device and photonic emission aiming device. The photonic emission device is generally a laser which can be controlled by a user at a remote location by issuing commands on a connected device. Accordingly, it would be desirable for the user to be able to control the laser using swipe and tap input at the connected device.

SUMMARY OF THE INVENTION

The present invention is directed to a remote interaction device, and more particularly to a device at a first location which allows a user at a second, remote location to control a laser pointer at the first location with movement input. The movement input may include tap and swipe on a touch screen, movement of a computer mouse, pressing of keys on a keyboard, and so on.

In accordance with an example embodiment of the present invention, a remote interaction device is provided. The device generally has audio-visual recording and transmitting functionality to provide an operator at a remote location with an audio-visual feed of the environment near the device. The device also has a light emission component which the operator controls and which projects light onto a surface in the environment in the vicinity of the device. The systems, devices, and methods provide operators with the ability to control the positions of the light emission by tracking movement at a remote device at the remote location.

In some embodiments, a method of facilitating remote interaction is provided. The method includes recording visual data at a first location and transmitting the recorded visual data to a second location, receiving the visual data, that was recorded at the first location, at the second location and displaying the visual data on a local device at the second location, and tracking movement input positions on a display of the local device to control the aim of a photonic emission device at the first location.

In some embodiments, a system for facilitating remote interaction is provided. The system includes an interaction device located at a first location, a local device located at a second location, the local device connected to the interaction device over a network, and wherein the local device tracks movement input positions on a display of the local device to control the aim of a photonic emission device at the interaction device.

Other systems, devices, methods, features and advantages of the subject matter described herein will be or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

As used herein and in the appended claims, the singular forms "a", "an", and "the" include plural referents unless the context clearly dictates otherwise.

In the following description and in the figures, like elements are identified with like reference numerals. The use of "e.g.," "etc," and "or" indicates non-exclusive alternatives without limitation, unless otherwise noted. The use of "including" or "includes" means "including, but not limited to," or "includes, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

Turning now to the drawings, FIGS. 1-8 illustrate exemplary embodiments of an interaction device at a first location which allows a user at a second, remote location to control a laser pointer at the first location using movement input. The movement input may include tap and swipe on a touch screen, movement of a computer mouse, pressing of keys on a keyboard, and so on. The first location may be a geographic area where a pet is located, for example, in a room in a home. The interaction device may include data and video recording capability, and at least a pointer, for example, a laser pointer. The interaction device may record data at the first location and transmit data to a remote device at a second location which is geographically remote from the first location, for example, at an office remote from the home where the pet is located. A user at the second, remote location may use movement input at the remote device to remotely track and control the laser pointer in the interaction device.

Figure 1:
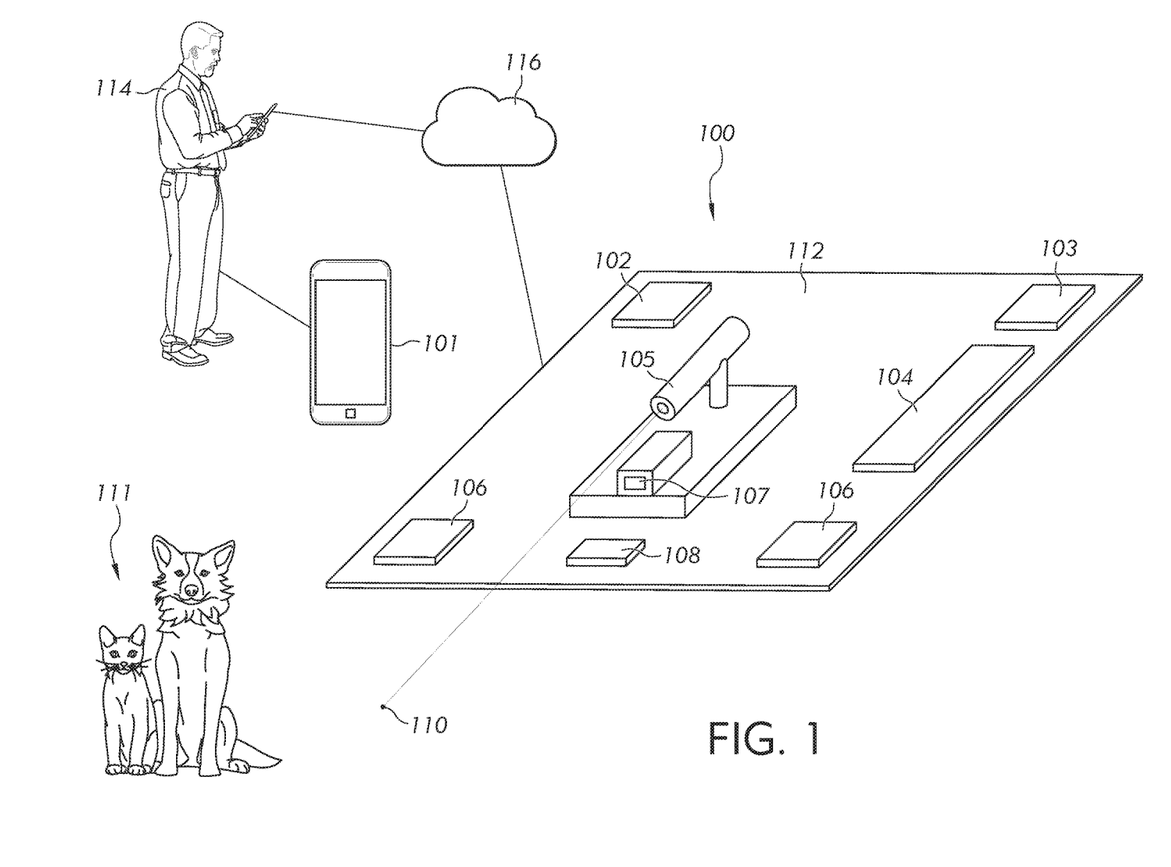
FIG. 1 is a visual representation of an exemplary embodiment of a remote interaction system and subjects in accordance with an embodiment of the present invention.

FIG. 1 is a visual representation of a remote interaction system and subjects in accordance with an example embodiment of the present invention. The subjects may be, for example, pets or people. Generally, FIG. 1 shows an operator 114, a connected device 101, pet(s) 111, network 116, and remote interaction device 100. The network 116 may be, for example, the Internet and/or a cellular-based wireless network. The remote interaction device 100 may be wired or wirelessly connected to the network 116, for example, via a wired or wireless local area network (LAN).

In the exemplary embodiment shown in FIG. 1, the operator 114 is a pet owner or other human. The operator 114 may be able to interact with the pet 111 at a remote location, geographically remote from the pet 111, by using the connected device 101 to monitor and control the remote interaction device 100. Connected device 101 in the exemplary embodiment of FIG. 1 is shown as a tablet computer, however, in other embodiments, the connected device 101 may be a desktop, laptop, notebook computer, wearable computer such as a smart watch, glasses or contact lenses, a smart phone, or any other device with wireless network connectivity. The remote interaction device 100 and the connected device 101 may be connected to each other wirelessly over a wireless network connected to the network 116, which may be the Internet and/or a cellular network. In some embodiments, the network 116 may be a broadband wireless network or other high bandwidth packet switch network.

Remote interaction device 100 in the example embodiment may be made of various modules and components which facilitate the operator 114's interaction with the pet 111. In some embodiments, the remote interaction device 100 may connect to the network 116 using a wireless connection module 102. The wireless connection module 102 and other modules and components of the remote interaction device 100 may receive power from a power module 103. In some embodiments, the power module 103 may receive power via a universal serial bus (USB) interface, although in other embodiments other interfaces may be used. The CPU module 104 is a central processing unit (CPU) which generally controls all systems and processes in the remote interaction device 100.

A microphone 108 and a camera module 107 provide for audio and visual data capture at the location of remote interaction device 100 and may transmit the captured data to allow the operator 114 to view and hear what is going on at the location of the remote interaction device 100, using the connected device 101. In some embodiments, the remote interaction device 100 may record and store the captured data in a data storage (not shown). A laser positioning module 105 is operatively connected to laser beam 110 and controls its positioning. The casing 112 provides a protective housing for all components and modules of the remote interaction device 100. In some exemplary operations, the laser beam 110 and the speakers 106 may allow the operator 114 to have interaction with the location of remote interaction device 100, thus providing visual stimulation and audio stimulation respectively for the pet 111.

Figure 2:
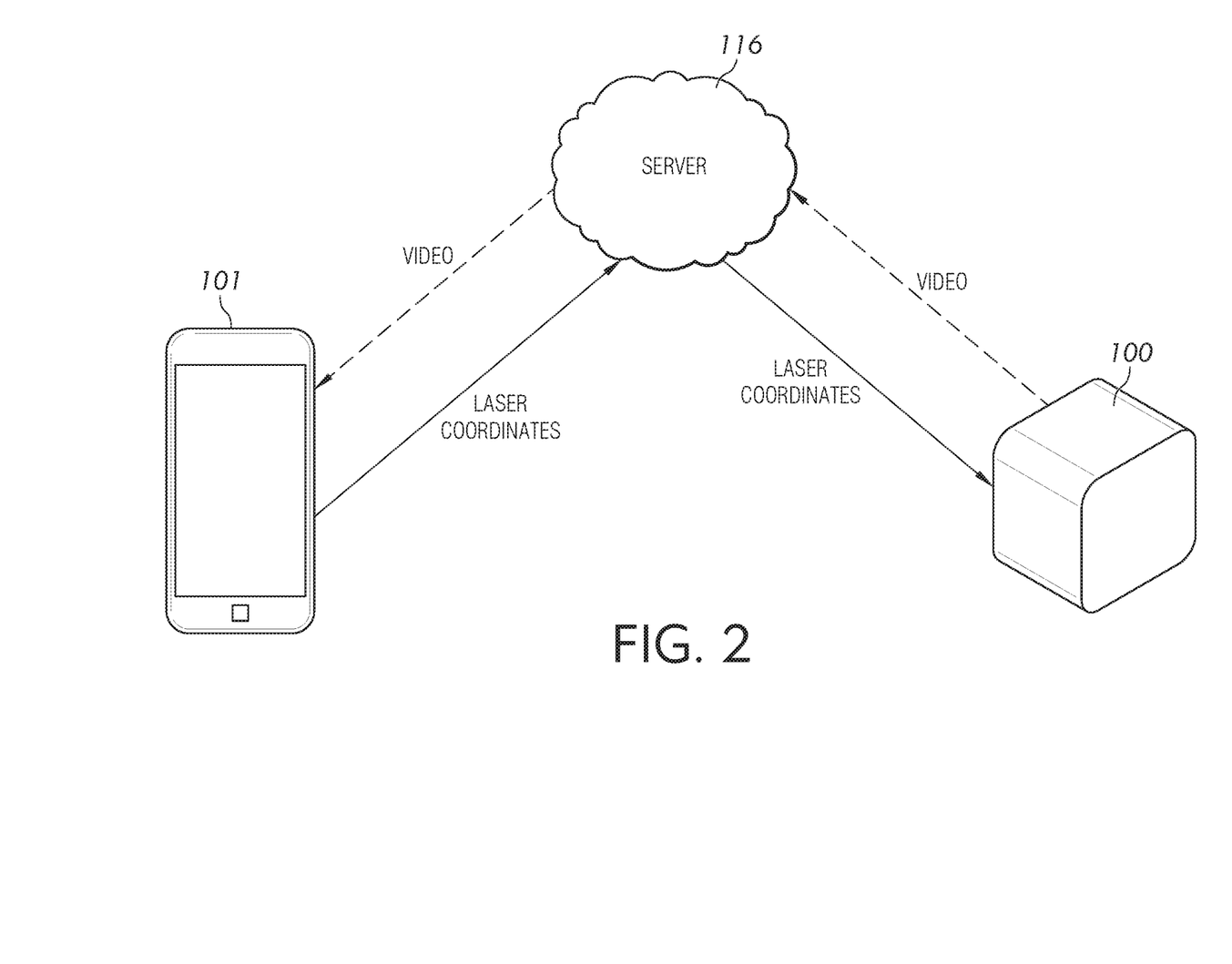
FIG. 2 is a diagram illustrating exemplary data transmission between a remote interaction device and a remote connected device in accordance with an embodiment of the present invention.

FIG. 2 illustrates an exemplary communication exchange between a remote interaction device 100 and a connected device 101. As described herein, the remote interaction device 100 may record and transmit data and video of activities at the location of the remote interaction device 100 to the connected device 101 (e.g., through a server connected to the network 116). A user at the connected device 101 may use movement input which is transformed to relative coordinates and transmitted to the remote interaction device 100 to control a laser pointer of the remote interaction device 100.

Figure 3:
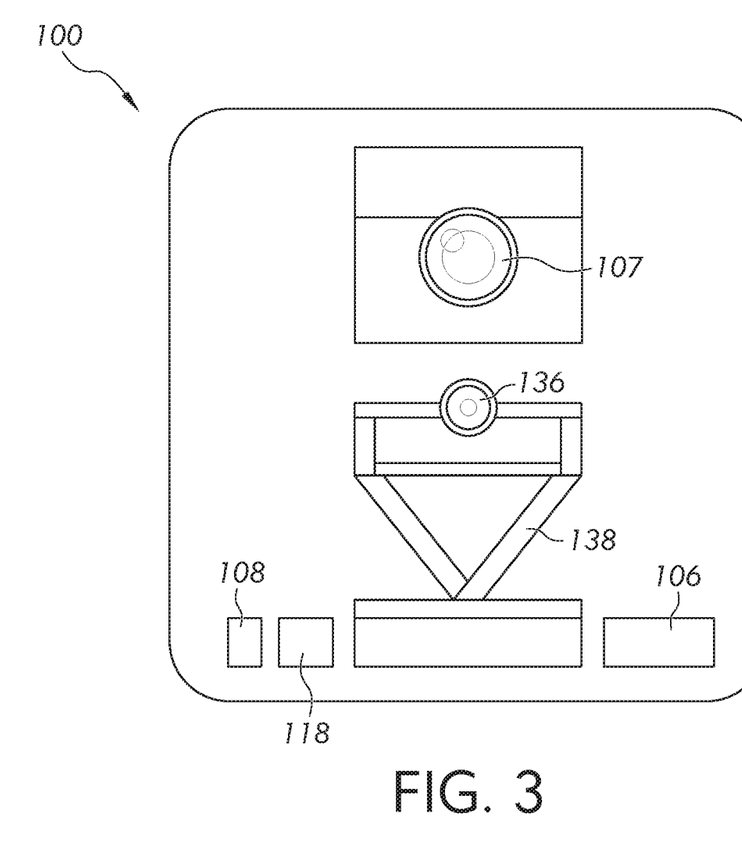
FIG. 3 is a cutaway view of the front of a remote interaction device in accordance with an embodiment of the present invention.

FIG. 3 shows a cutaway view of the front of the remote interaction device 100 in accordance with an exemplary embodiment of the present invention. The remote interaction device 100 shown in FIG. 3 may generally include a camera module 107, a laser pointer module 136, a pan and tilt platform 138, a microphone 108, an RGB LED notifier 118, and one or more speakers 106.

It should be noted that each of the components shown in FIG. 3 may be located at different locations within the device from those shown in the exemplary embodiment. But in general, the camera module 107 and laser pointer module 136 face outward from the same face of the device so as to allow the camera module 107 to record a video feed in the same direction that the laser pointer module 136 allows for interaction with the environment, such as shining on a surface.

The camera module 107 in some embodiments may be a video recording device with a wide angle lens which allows for a video recording of the environment in front of camera module 107. In some embodiments, the camera module 107 may be a CMOS sensor and a camera lens as well as a printed circuit board (PCB). In other embodiments, the camera module 107 may use other digital video recording devices or other appropriate video recording devices. A wide angle lens may be used in some embodiments to allow for video recording of the environment without the need to move the camera to follow particular subjects or specific locations within the field of view of the camera module 107. In other embodiments, other appropriate lenses may be used.

In some embodiments, the camera module 107 may capture high definition (HD) video although in other embodiments, lower definition video may be captured.

The camera module 107 in some embodiments may have focusing capabilities which allow for focusing based on the distance of a subject from the camera module 107. In some embodiments, the focusing capability may be performed automatically by internal processing of a camera processor which is operable to process visual data signals from the camera module 107. In some embodiments, focusing may be performed manually by a user at a remote location by engaging an appropriate command on the connected device 101.

In some embodiments, additional components may be provided in the camera module 107 such as camera aiming devices, alternate and/or changeable filters, and others which allow a user to view different areas of the room by positioning the direction of the camera and viewing through different filters. In some embodiments, automatic motion-capture components may be used in order to direct the camera to capture movement in the environment such as movement of the pet 111.

The laser positioning module 105 in some embodiments may be made of a laser pointer module 136 which may be a laser pointer that emits light through optical amplification. Light emitted by the laser pointer module 136 may be directed to a specific location in the environment such as on a surface. Typical surfaces may be floors, furniture, walls, or other suitable surfaces. Many animals become interested in light such as lasers projected on surfaces. These animals will follow the light and try to catch it or capture it, providing entertainment for the animal. In some embodiments, the laser pointer module 136 uses a laser which is safe for use around humans and animals.

The pan and tilt platform 138 in some embodiments may be a platform to which laser pointer module 136 is mounted. The pan and tilt platform 138 provides the mechanical support which controls the physical location that the laser module 136 is pointing a laser beam 110. In some embodiments, electromagnets may be used to control the panning and tilting of the pan and tilt platform 138. The pan and tilt platform 138 will be described further herein and is also referred to as laser positioning device 600.

The microphone 108 in some embodiments may be a microphone which is operable to receive audio input signals from the environment such as barking from a dog, meowing from a cat, or other input signals. In some embodiments, the microphone 108 may be coupled to a processor which is operable to recognize when a sound is made in the environment. In some embodiments, this may trigger processes within the remote interaction device 100 such as notifying the operator 114 via or at the connected device 101 that noise is being made near the remote interaction device 100, beginning visual recording using the camera module 107, or other processes.

The RGB LED notifier 118 in some embodiment may be a light emitting diode (LED) which indicates the status of the remote interaction device 100. In some embodiments, status indications may include power, standby, transmit/receive, charging, or other suitable status indications. The RGB LED notifier 118 may indicate different device status in some embodiments by flashing, constant color display, alternating color display, or other suitable display methods. The RGB LED notifier 118 in some embodiments may be a single RGB LED. In other embodiments, the RGB LED notifier 118 may include multiple RGB LED's in various configurations.

The speaker 106 in some embodiments may be a speaker device which outputs audio signals into the environment near the remote interaction device 100. The speaker 106 in some embodiments may be operable to output audio signals such as a human voice, music, or other sounds received from the operator 114 via the connected device 101 over a wireless network connected to the Internet 116 and processed by an audio processor so as to communicate with the pet 111 near the remote interaction device 100. In some embodiments, multiple speakers may be used.

Figure 4:
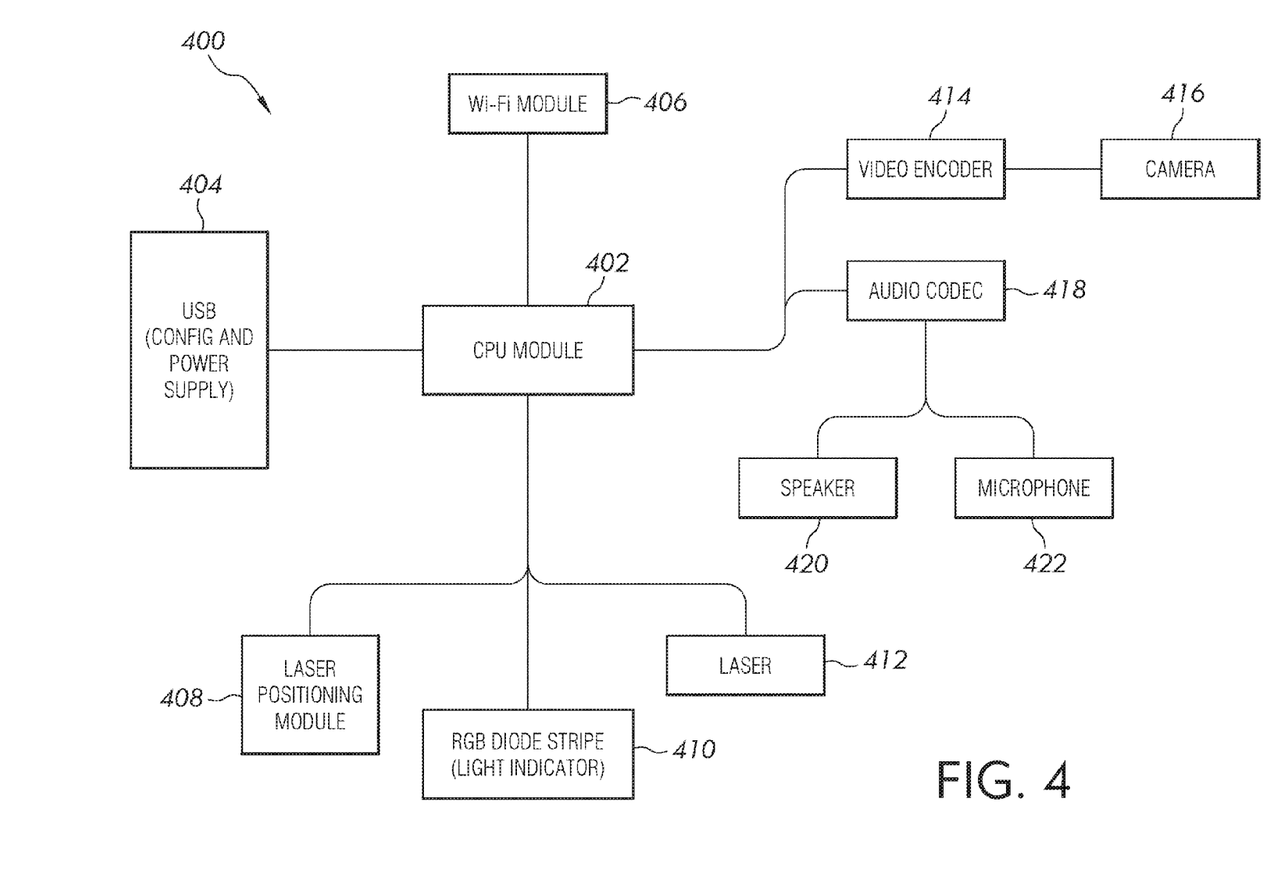
FIG. 4 is a schematic diagram of various modules of a remote interaction device and their relation to one another in accordance with an embodiment of the present invention.

Turning to FIG. 4, in accordance with some embodiments of the present invention, a diagram of the device modules 400 of the remote interaction device 100 is shown. As shown, a CPU module 402 controls a USB 404, a Wi-Fi module 406, a laser positioning module 408, an RGB LED 410, a laser 412, a video encoder 414, and an audio codec 418. In turn, the audio codec 418 controls one or more speakers 420 and a microphone 422, and the video encoder controls the camera 416. In some embodiments, additional processing units may be used and additional other modules may be added to provide increased functionality. Modules as used herein should be understood to have broad functionality, such as the laser positioning module 408 being operable in different embodiments to control electromagnets, servo-motors, or other laser positioning devices as required by the particular embodiments. Additionally, modules may control more than one components, such as when multiple speakers are used.

Generally, in some exemplary operations, when the operator 114 first powers on the remote interaction device 100, he/she must configure the device to communicate with a wireless network connected to the Internet 116. This may be called first-time mode. In the first-time mode, the operator 114 may receive data about the network name and password, if required. After completion of the first-time mode process, the remote interaction device 100 may operate in normal operation mode. The operator 114 may not need to be a remote interaction device 100 owner, but the operator 114 may be any person who wishes to interact with the remote interaction device 100s. User interfaces on the connected device 101 provide a way for the operator 114 to interact with and control the remote interaction device 100.

Turning to FIGS. 5-8, an exemplary interaction screen 500 user interface and movement input in accordance with some embodiments of the present invention are shown. In some embodiments, several fields and buttons may be shown in a pop-up menu 510. The pop-up menu 510 may be pulled out from the left side of the display on the connected device 101, or by tapping on a short-cut (not shown). The fields and buttons may include, for example, back button 512, tips button 514, share button 516, sound button 518, and laser control 520.

As mentioned above in FIGS. 1 and 3, the laser positioning module 105 may be made of the laser pointer module 136 which may be a laser pointer that emits light through optical amplification. Light emitted by the laser pointer module 136 may be directed to a specific location in the environment such as on a surface. In some embodiments of the interaction screen 500 user interface, the operator 114 may control the laser positioning module 105 of the remote device 100 and project the laser beam 110 to desired locations through input movement captured by a tracking source.

Figure 5:
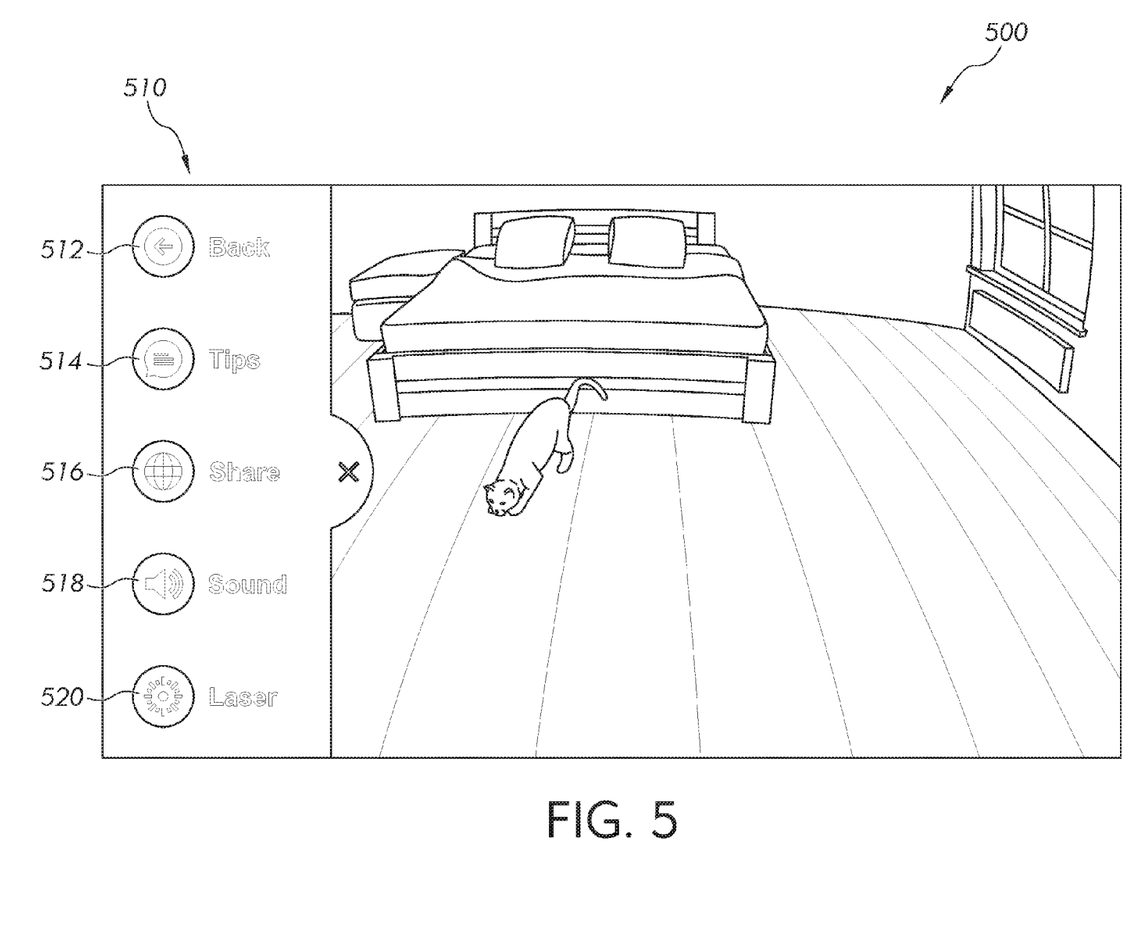
FIG. 5 is a visual portrayal of an exemplary user interface to interact with a remote interaction device in accordance with an embodiment of the present invention.
Figure 6:
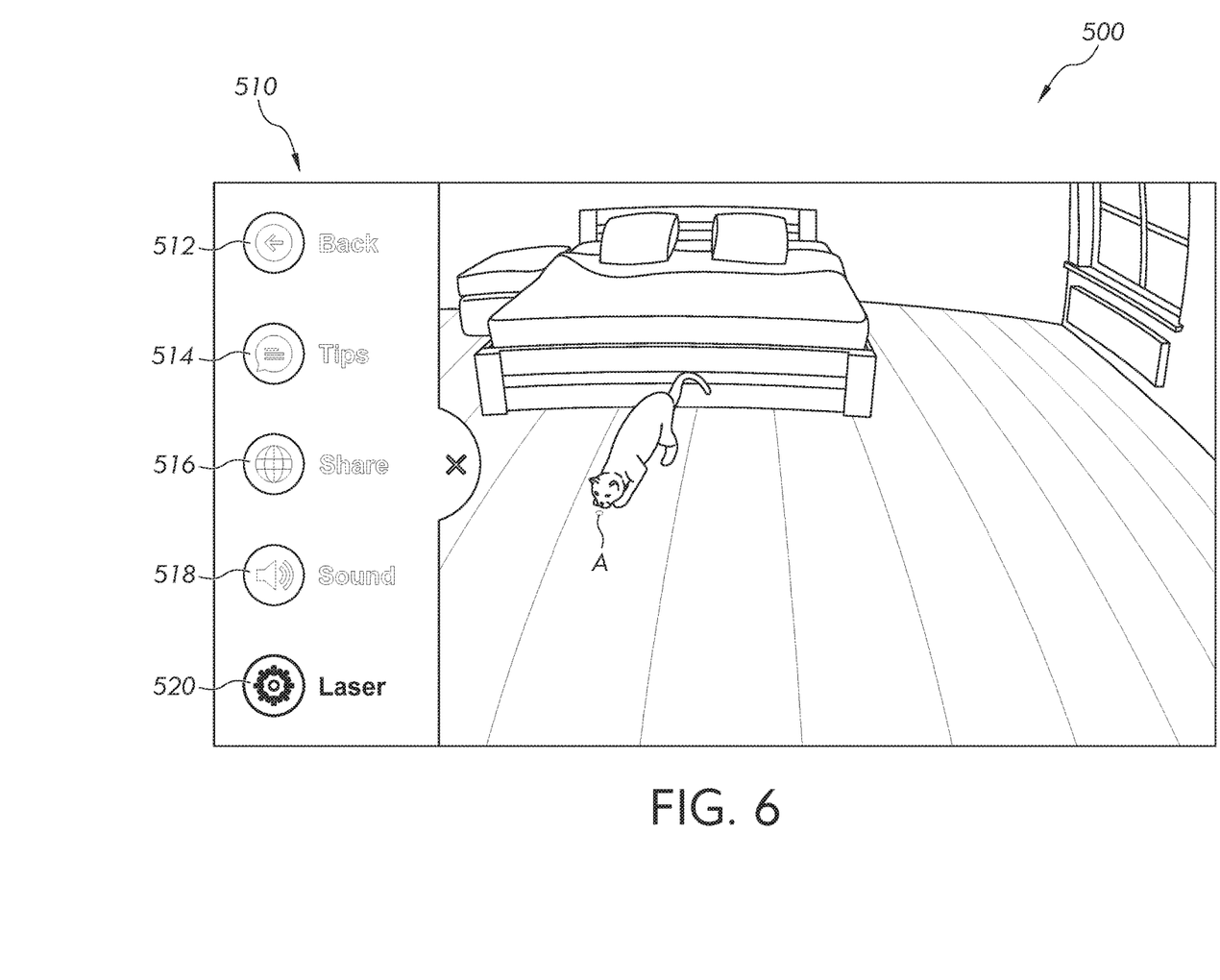
FIG. 6 is another visual portrayal of an exemplary user interface to interact with a remote interaction device in accordance with an embodiment of the present invention.
Figure 7A:
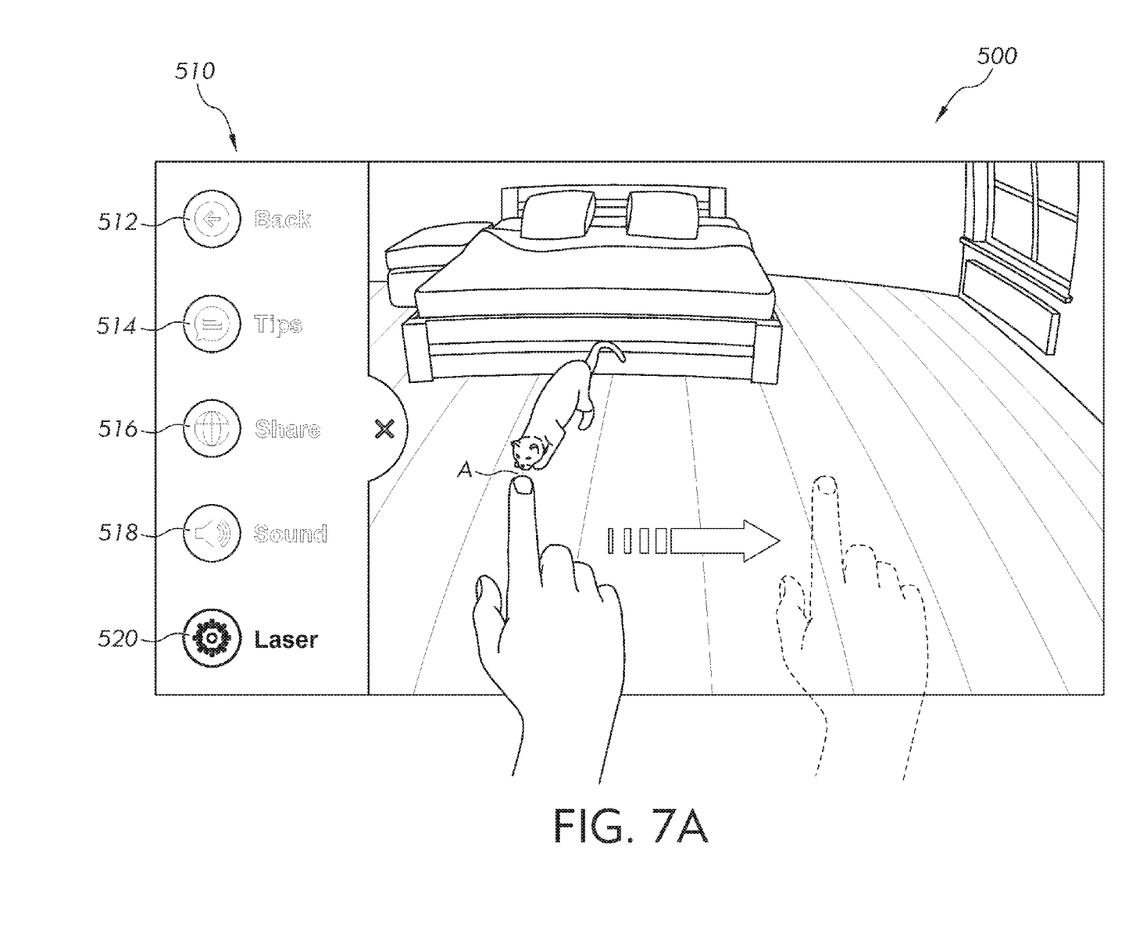
FIG. 7A is another visual portrayal of an exemplary user interface to interact with remote interaction device in accordance with an embodiment of the present invention.
Figure 7B:
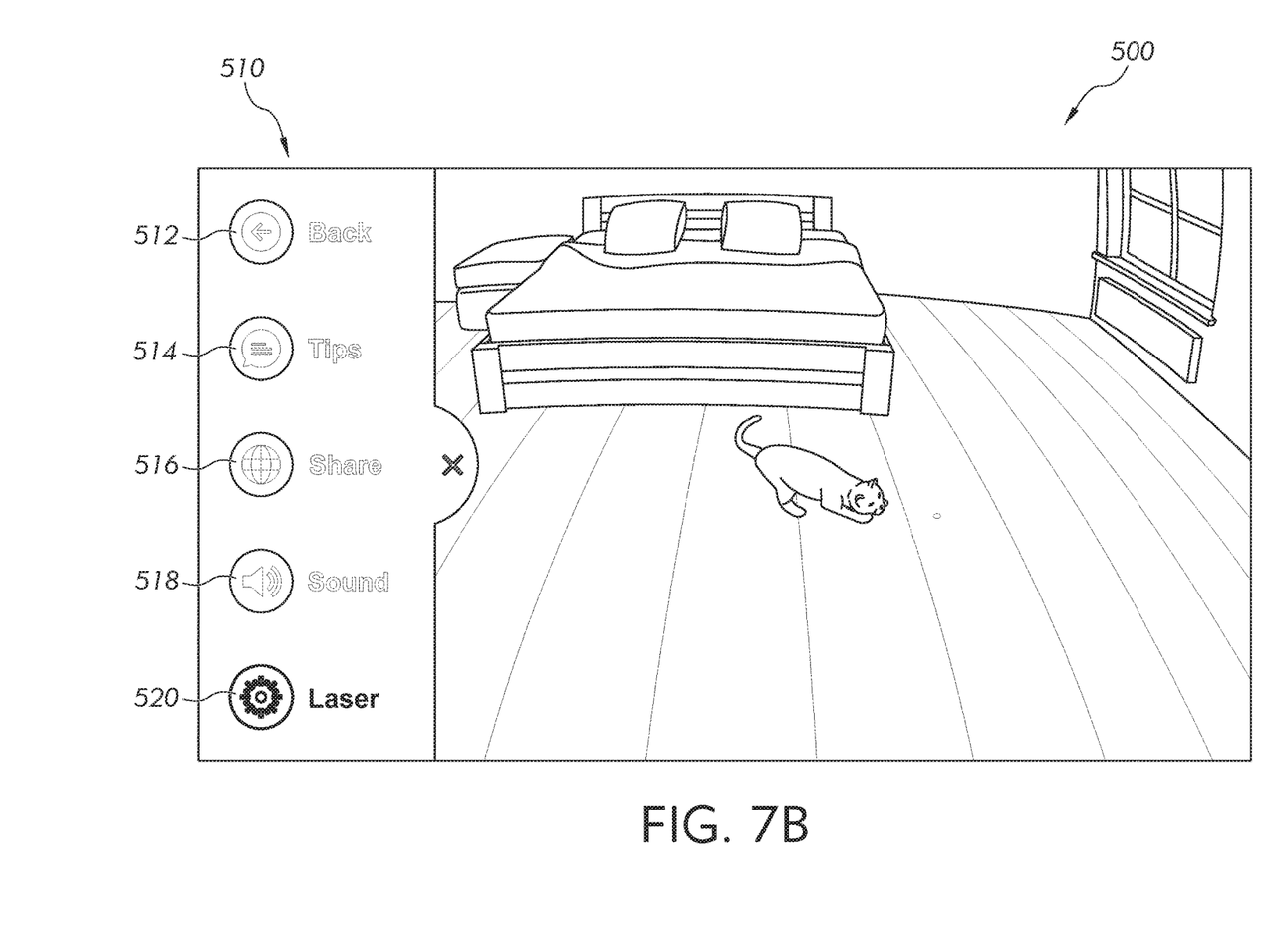
FIG. 7B is another visual portrayal of an exemplary user interface to interact with remote interaction device in accordance with an embodiment of the present invention.

As shown in FIGS. 5, 6, 7A and 7B, in some exemplary embodiments, the remote device 100 and the connected device 101 may be operated and function as follows. The operator 114 opens a software application provided on the connected device 101 to receive (e.g., through a server) a video stream (as shown in FIG. 5) from the remote device 100, as captured by the camera module 107. To turn on/off the laser at the remote device 100, the operator 114 may tap on the laser control 520. When the laser at the remote device 100 has been turned on, the operator 114 may touch the screen of the connected device 101, for example, with a finger (see FIG. 7A). As the operator 114 touches a position on the touch screen (e.g., location A), the provided application reads the position of the finger in coordinates of the screen of the connected device 101. The finger position is automatically transformed into video stream coordinates (e.g., at 1280×720 pixel). The position is then transformed to relative coordinates (e.g., [−1 . . . 1]). The position is then adjusted by selected calibration data, if any is available. The adjusted relative coordinates are then transmitted to the remote device 100, for example, through the server. The remote device 100 receives and processes the coordinates, and points the laser beam 110 to the position in the platform corresponding to the position from the video (as shown in example in FIG. 6). As the operator 114 performs a movement input, for example, moves (or swipes) his/her finger, the positions of the finger on the touch screen are tracked and processed as above, resulting in the laser beam 110 pointing to corresponding positions at the location of the remote device 100 (see, for example, FIG. 7B).

It should be noted that although the above example shows the connected device 101 with a touch screen for tracking the positions of a finger, other tracking sources may be used when the connected device 101 does not have a touch screen as discussed herein.

Figure 8:
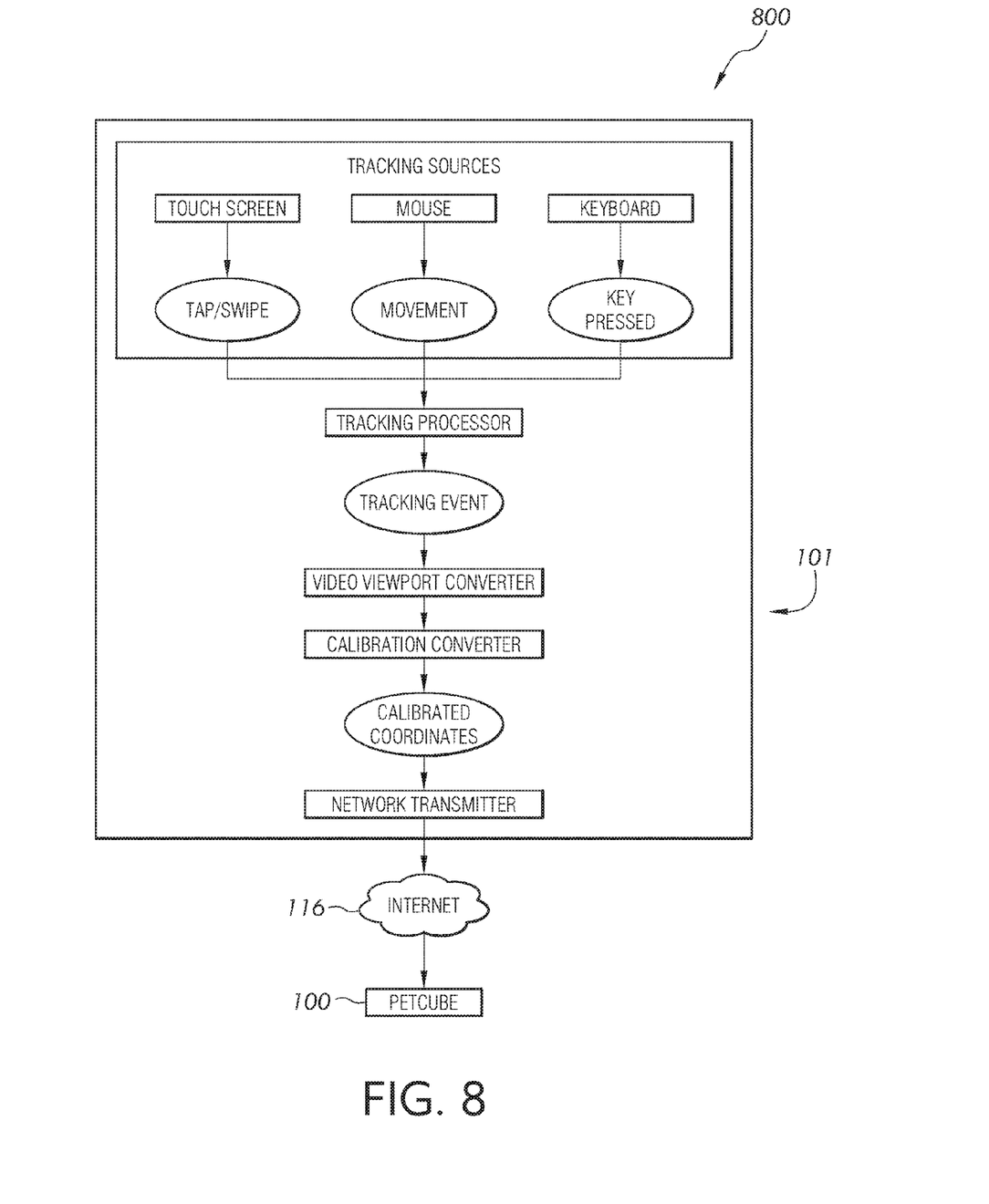
FIG. 8 is a diagram of various exemplary components of a remote connected device in accordance with an embodiment of the present invention.

Turning to FIG. 8, a diagram 800 of the connected device 101 in accordance with some embodiments of the present invention is shown. As mentioned herein, the connected device 101 may be a desktop, laptop, or notebook computer, wearable computer such as a smart watch, glasses or contact lenses, a smart phone, or any other device with wireless network connectivity. Accordingly, the connected device 101 may include corresponding tracking source, for example, to control the laser beam 110. For example, when the connected device 101 is a smart phone or a tablet, the tracking source may be a touch screen. When the connected device 101 is a desktop or laptop, the tracking source may be a mouse or a keyboard. Other suitable tracking sources are also contemplated and are not limited to the examples above. A tracking processor receives data from the tracking source to produce the tracking event. A video viewport converter and calibration converter may transform and adjust the tracking event to produce the calibrated coordinates as described above. The adjusted relative coordinates are then transmitted to the remote device 100. It is noted that the tracking processor, the video viewport converter, the calibration converter, and the network transmitter may be software, hardware, or a combination thereof.

While embodiments of the present invention have been shown and described, various modifications may be made without departing from the spirit and scope of the present invention, and all such modifications and equivalents are intended to be covered.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A method of facilitating remote interaction comprising:
   recording visual data at a first location and transmitting the recorded visual data to a second location, wherein the visual data includes a view of an environment at the first location;
   receiving the visual data, that was recorded at the first location, at the second location and displaying the visual data on a display screen of a local device at the second location;
   providing a virtual control icon on the display screen of the local device for powering on a laser pointer module at the first location;
   receiving, from the display screen of the local device, a first touch input to power on the laser pointer module at the first location;
   transmitting the first touch input to the first location;
   powering on the laser pointer module at the first location;
   receiving, from the display screen of the local device, a second touch input representing a first position on the display screen;
   transforming the first position input into first relative coordinates;
   transmitting the first relative coordinates to the first location;
   pointing a beam of the laser pointer module to a second position at the first location, wherein the second position corresponds to the first position on the display screen of the local device;
   receiving, from the display screen of the local device, a swipe input, wherein the swipe is a movement from the first position on the display screen to a third position on the display screen;
   transforming the third position input into second relative coordinates;
   transmitting the second relative coordinates to the first location; and
   moving the beam of the laser pointer module to a fourth position at the first location, wherein the fourth position corresponds to the third position on the display screen of the local device.

2. The method of claim 1, wherein the first and second relative coordinates are further adjusted, at the local device at the second location, by selected calibration data.

3. A system for facilitating remote interaction comprising:
   an interaction device located at a first location;
   a local device located at a second location, the local device connected to the interaction device over a network;
   wherein the local device is configured to:
      receive from the interaction device recorded visual data at the first location, wherein the visual data includes a view of an environment at the first location;
      provide a virtual control icon on the display screen of the local device for powering on a laser pointer module at the first location;
      receive, from the display screen of the local device, a first touch input to power on the laser pointer module at the first location;
      receive, from the display screen of the local device, a second touch input representing a first position on the display screen;
      transform the first position input into first relative coordinates;
      transmit the first relative coordinates to the first location;
      receive, from the display screen of the local device, a swipe input, wherein the swipe is a movement from the first position on the display screen to a second position on the display screen;
      transform the second position input into second relative coordinates;
      transmit the second relative coordinates to the first location; and
   wherein the interaction device is configured to:
      upon receiving the first relative coordinates from the local device, point a beam of the laser pointer module to a third position at the first location, wherein the third position corresponds to the first position on the display screen of the local device;
      upon receiving the second relative coordinates from the local device, move the beam of the laser pointer module to a fourth position at the first location, wherein the fourth position corresponds to the second position on the display screen of the local device.

4. The system of claim 3, wherein the first and second relative coordinates are further adjusted, at the local device at the second location, by selected calibration data.

* * * * *

UNITED STATES PATENT AND TRADEMARK OFFICE
CERTIFICATE OF CORRECTION

PATENT NO. : 10,085,423 B2  
APPLICATION NO. : 15/352270  
DATED : October 2, 2018  
INVENTOR(S) : Olexandr Neskin, Iaroslav Azhniuk and Andrii Kulbaba

Page 1 of 1

It is certified that error appears in the above-identified patent and that said Letters Patent is hereby corrected as shown below:

On the Title Page

Item (73):
Oleksandr Neskin's name should be corrected to read Olexandr Neskin.

Signed and Sealed this
Sixteenth Day of April, 2019

Andrei Iancu
*Director of the United States Patent and Trademark Office*